United States Patent

[11] 3,559,639

[72] Inventors Wilfred Nagus;
 Steven A. Bell, Santa Monica, Calif.
[21] Appl. No. 750,258
[22] Filed Aug. 5, 1968
[45] Patented Feb. 2, 1971
[73] Assignee Puritan-Bennett Corporation
 Kansas City, Mo.
 a corporation of Missouri

[54] SPIROMETER MONITORING DEVICE
 15 Claims, 11 Drawing Figs.
[52] U.S. Cl. .................................................. 128/2.08,
 128/142.4; 340/213
[51] Int. Cl. ...................................................... A61b 5/08,
 A61b 7/00; G08b 21/00
[50] Field of Search .......................................... 128/2.08,
 1.02, 2.07, 2, 188, 2.05, 140,
 145.5, 145.8; 340/(Inquired), 213, 240, 279, 282;
 73/(Inquired); 200/83, 84, 84.3; 335/20.5

[56] References Cited
 UNITED STATES PATENTS
3,251,359 5/1966 Ismach ......................... 128/145.8
3,285,183 11/1966 Hembree et al. ............. 200/84.3
3,316,902 5/1967 Winchel et al. ............... 128/145.5
3,333,584 8/1967 Andreason et al. .......... 128/145.5
3,347,222 10/1967 Kohrer ......................... 128/2
3,411,076 11/1968 Federici et al. .............. 324/34
3,433,217 3/1969 Rieke ............................ 128/2.08

Primary Examiner—Richard A. Gaudet
Assistant Examiner—J. B. Mitchell
Attorney—Fulwider, Patton, Rieber, Lee and Utecht ABSTRACT: A monitoring device for attachment to a spirometer with an expansible-contractable bellows to provide an alarm signal when indicated respiration ceases for a predetermined time period or when the tidal volume goes below a certain minimum for the same predetermined time period. An electronic audible-alarm signal generator is maintained in an inactive condition by a resettable time delay network. A magnet movable with the bellows actuates a reed switch in the monitor to generate a reset signal to reset the time delay network. If the time delay network is not reset within the predetermined time period by appropriate movement of the bellows and magnet, the alarm signal generator is activated. An auxiliary, inhibit network is provided for deactivating the monitor for a longer predetermined time period when initially turned on after which the monitor automatically resumes its monitoring function. The auxiliary inhibit network and time delay network may be selectively overridden by a manually operated override circuit.

PATENTED FEB 2 1971
3,559,639
SHEET 1 OF 2
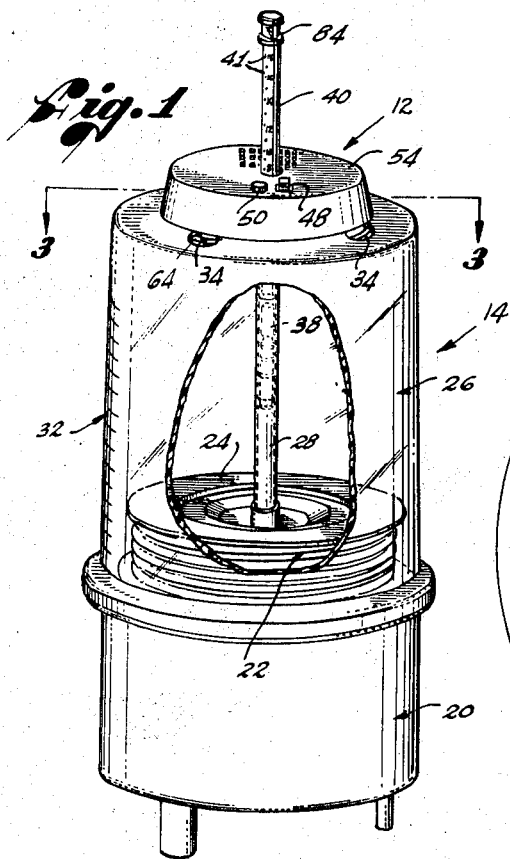
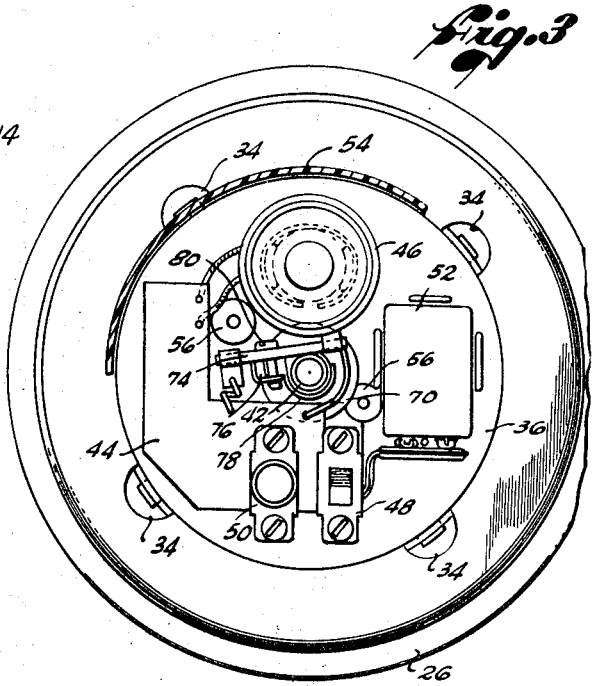
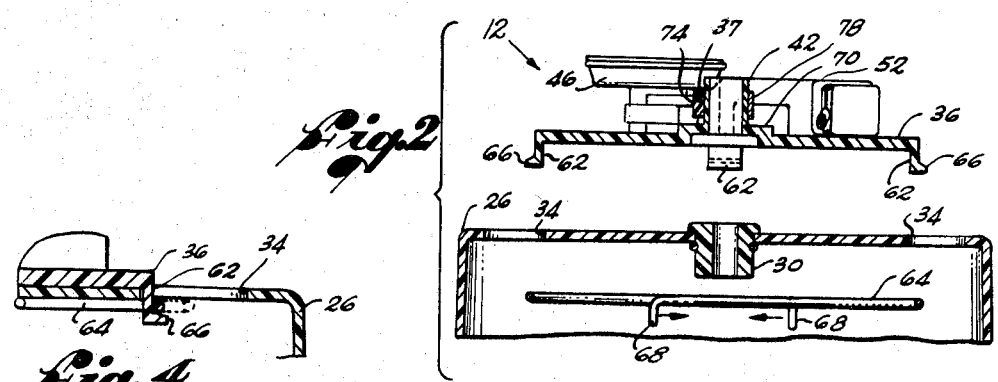
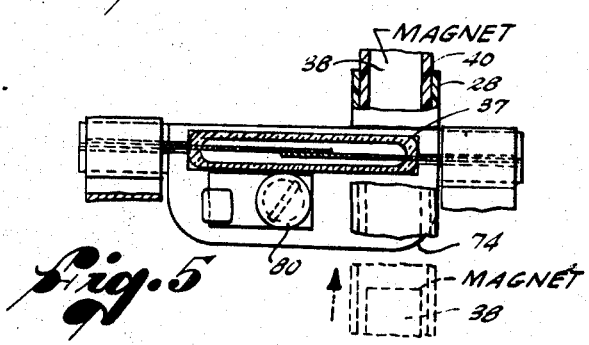
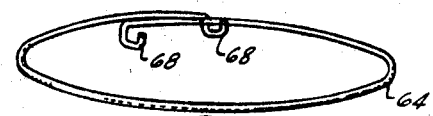
INVENTORS
WILFRED NAGUS
STEVEN A. BELL
BY
Zulurider, Patton, Rieber
Lee, and Utecht
ATTORNEYS

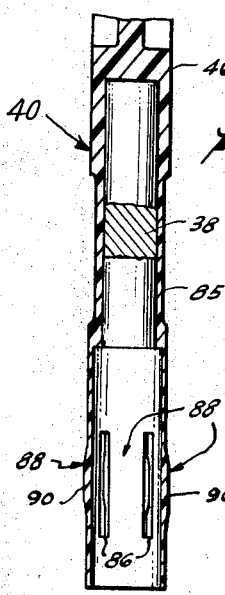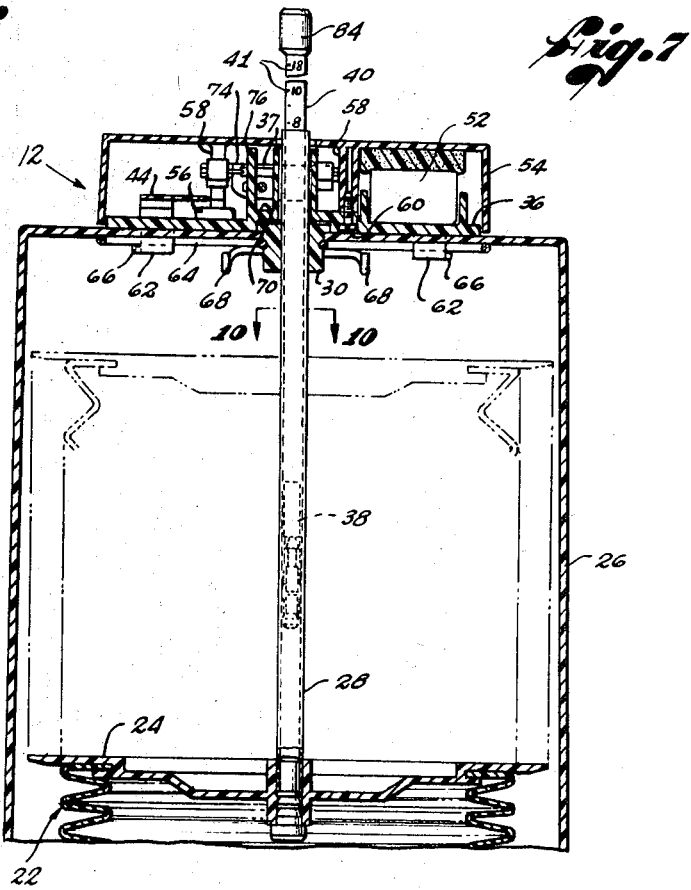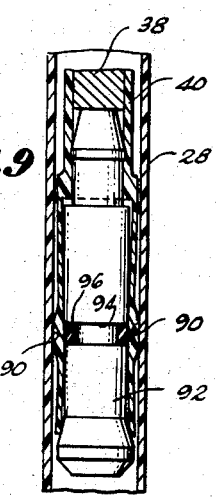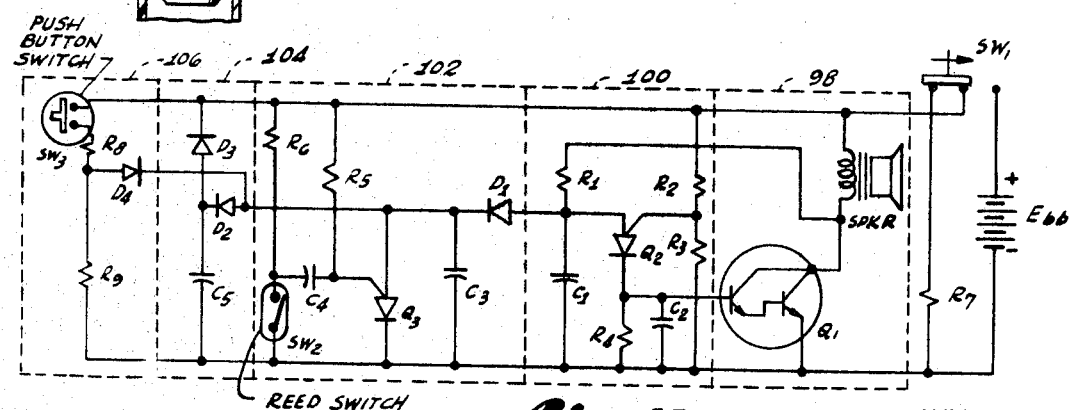

3,559,639

SPIROMETER MONITORING DEVICE

BACKGROUND OF THE INVENTION

This invention relates generally to monitoring devices and more particularly to a monitoring device for attachment to a spirometer to provide an alarm signal when indicated respiration ceases, or tidal volume drops below a certain minimum, for a predetermined time period.

A spirometer is commonly used with respiration apparatus to monitor the breathing of a patient or the amount of ventilation provided by a respirator. Through observance of the spirometer, an attendant can keep a close watch on the tidal volume and respiration rate of a patient. A spirometer for accomplishing these ends is described in copending application Ser. No. 451,433, filed on Apr. 28, 1965, and has a case with a vertically expansible-contractible bellows enclosed in a transparent viewing dome and arranged to receive expired air. The tidal volume can be determined by observing the position of the top wall of the bellows with respect to graduations on the viewing dome during successive breathing cycles.

In some cases, the actual tidal volume and respiration rate are not as important as relatively sudden changes in these particular parameters which may occur. In particular, if a patient stops breathing entirely or the tidal volume of his breathing decreases below a necessary minimum, there is a relatively short period of time during which additional medical aid must be rendered to prevent the patient from dying or suffering irreparable injury.

As the term "breathing" is used herein, it will be understood to have reference to spontaneous breathing, breathing with the aid of respiration apparatus and ventilation of a patient by respiration apparatus where he is incapable of breathing spontaneously.

Therefore, in cases where breathing may stop or the tidal volume may decrease below a minimum, an attendant must be with the patient at all times and must continually observe the spirometer. The problem is especially acute when the nature of a patient's illness is such as to require the use of a respiration apparatus for a considerable time period.

Often under circumstances in which a respiration apparatus and associated spirometer are used, it may only be necessary for the attendant to determine if a patient has stopped breathing entirely or if the tidal volume decreases to a point where additional medical aid may be required. Depending upon the condition of the patient, the relatively sudden changes in the quality of breathing may or may not occur for a considerable period of time. Requiring a qualified attendant to be present and continually observe the spirometer, prevents the attendant from doing other useful work. Also, there is some danger that cessation of proper ventilation of the patient will not be determined promptly.

SUMMARY OF THE INVENTION

To eliminate the requirement that a spirometer be continuously observed in order to detect certain changes in the breathing of a patient, the present invention provides a monitor for a spirometer which generates an alarm signal whenever a patient's breathing, as measured by the spirometer, stops for a predetermined time period or the tidal volume of his breathing decreases below a minimum for the same period.

The spirometer monitor of the present invention has sensing means fixed in place with respect to the case of the spirometer and a follower means movable in accordance with the movement of the spirometer bellows. An alarm means is provided which generates an alarm signal a predetermined time period after a reset condition. Reset means associated with the follower means and sensing means serves to reset the alarm means to the reset condition when the follower means moves into a predetermined attitude with respect to the sensing means.

If the spirometer bellows should stop moving for any reason, such as cessation of the patient's breathing, the alarm means is not reset and, after the predetermined time period elapses, the alarm means is activated. Also, if the patient's indicated tidal volume drops below a preset minimum, the follower means and bellows move an insufficient amount to bring the follower means into the predetermined attitude with respect to the sensing means. If the indicated tidal volume remains below the preset minimum for the predetermined time period, the alarm means will also be activated.

An additional feature of the presently preferred embodiment of the monitoring device is that its monitoring function can be temporarily, manually inhibited for a somewhat longer time period than the predetermined time period. This enables the respiration apparatus to be removed from a patient for a short time to perform other medical procedures without the alarm means being activated. The monitoring device automatically resumes its monitoring function after the expiration of the longer time period and is, therefore, prevented from being inadvertently left off.

An override means is provided to temporarily override the functioning of the reset and inhibit means and to activate the alarm means. This enables the functioning of the monitor to be checked without waiting the duration of the predetermined time period. Additionally, it facilitates adjustment of the monitoring device.

In a presently preferred embodiment of the spirometer monitor of the present invention, the sensing means is mounted on a base platform detachably mountable on the top of the viewing dome of the spirometer. The means for actuating the sensing means is carried within a guide tube and moves along with the bellows of the spirometer. The preset minimum tidal volume, below which the sensing device is actuated, is selectively adjustable by varying the position of the actuating means in the guide tube with respect to the top wall of the bellows.

The present invention also includes an improved alarm means having an alarm signal generating means and associated electrical control means for maintaining the alarm signal generating means in an inactive state for the predetermined time period following a reset condition. A reset means is provided for electrically resetting the control means to the reset condition in response to a reset signal.

In the described and illustrated embodiment of the alarm means, the alarm signal generating means is basically a relaxation oscillator with the time constant provided by a resistor and timing capacitor resulting in oscillation in the audio frequency range. The electrical control means includes a second capacitor connected through a diode in parallel across the timing capacitor to considerably increase the time constant so that the charging period for the combination is the predetermined time period. The reset means includes an electronic switch connected across the second capacitor which serves to discharge both capacitors when closed in response to the reset signal.

If the voltage across the capacitors is not reset to an initial value before the predetermined time elapses, the voltage across the timing capacitor reaches the threshold voltage of the threshold device associated with the relaxation oscillator and the timing capacitor discharges. The reverse biased diode effectively disconnects the second capacitor from the timing capacitor and the frequency of oscillation is in the audio range.

The inhibit time period is provided by a third capacitor connected through a diode across the second capacitor to increase the initial charging time even further to provide the inhibit time period. All three capacitors are discharged through a low resistance discharge path each time the monitor is turned off. The inhibit time period is then initiated when the monitor is turned back on.

The time delay and inhibit periods are effectively overridden by rapidly charging the second and third capacitors through a manually operated low resistance charging path.

BRIEF DESCRIPTION OF THE DRAWINGS

FIG. 1 is a perspective view of the presently preferred embodiment of the monitor of the invention, the monitor being shown in place on the viewing dome and bellows of a spirometer;

FIG. 2 is a sectional, exploded view of the monitor and spirometer viewing dome, with portions of the monitor removed for added clarity;

FIG. 3 is a top plan view of the monitor shown in place on the viewing dome of the spirometer with a cover of the monitor removed;

FIG. 4 is an enlarged sectional view of a portion of the means for attaching the base of the monitor to the viewing dome;

FIG. 5 is an enlarged view, partly in elevation and partly in section, of the reed switch mount with the rod and tube of the monitor shown broken away;

FIG. 6 is a perspective view of the retaining ring of the monitor;

FIG. 7 is a sectional elevational view of the monitor shown in place on the spirometer;

FIG. 8 is an enlarged fragmentary sectional view of the lower portion of the rod of the monitor;

FIG. 9 is also an enlarged fragmentary sectional view of the lower portion of the rod of the spirometer shown in place in its associated tube;

FIG. 10 is an enlarged sectional view taken along the line 10–10 in FIG. 7; and

FIG. 11 is a schematic diagram of the electronic circuitry of the monitor.

DESCRIPTION OF THE PREFERRED EMBODIMENT

Referring now to the drawing, particularly FIG. 1, the presently preferred embodiment of the spirometer monitor of the invention, designated by the reference numeral 12 is adapted for use with spirometer 14. The monitor 12 is self-contained, battery powered and detachably mounted on the spirometer. The monitor 12 is selectively operable so that it can be left in place on the spirometer and turned on only when it is desired to utilize its monitoring function.

The spirometer 14 is described in detail in copending application Ser. No. 451,433 and, for this reason, is not described in detail here. For present purposes it is noted that the spirometer 14 has a case 20 mounting an expansible-contractible bellows 22. The bellows 22 is encased in a transparent viewing dome 26 so that its movement can be observed.

The vertical expansion and contraction of the bellows 22 is guided by a tube 28 attached to the center of a rigid top wall 24 of the bellows through a bushing 30 (FIG. 2) in the top of the dome 26. The extent of expansion of the bellows 22, corresponding to the tidal volume of the patient, may be observed with the aid of graduations 32 on the side of the viewing dome 26.

The viewing dome 26 is vented to the exterior by a plurality of vent holes 34 in the top of the dome 26. This permits the bellows 22 to expand and contract without any pressure buildup inside the dome and also facilitates mounting of the monitor 12.

In order for the monitor 12 to function to sense changes in the movement of the bellows 22 and respiration rate of a patient, it is constructed in two sections. The first section carries the sensing means and remains stationary with respect to the case 20 of the spirometer 14 while the second section includes the follower means responsive to movement of the bellows. Relative movement between the two sections is electrically sensed to indicate the undesired changes in the respiration of the patient.

More particularly, the first section of the monitor 12 includes a covered base platform 36 detachably mounted in place on the top of the viewing dome 26. Thus, it remains stationary with respect to the case 20. The sensing means carried by base platform 36 in the illustrated embodiment is a magnetically responsive device, such as a reed switch 37.

The second section of the monitor, here including a magnet 38, is cooperatively associated with the movable guide tube 28 passing through both the top of the viewing dome 26 and the base platform 36. In general terms, relative movement between the two sections is sensed by the reed switch 37 mounted on the base platform 36 which is actuated by the magnet 38 carried by a rod 40 adjustably slidable within the tube 28.

Movement of the bellows 22 causes a corresponding movement of the magnet 38 with respect to the base platform 36 and, when the patient is breathing, such movement is sensed by the magnetically responsive reed switch 37 in the base platform 36. If the patient ceases breathing, the bellows 22 and magnet 38 do not move, and the electronic circuitry in the monitor is so constructed and arranged that the alarm signal is generated after a predetermined time period.

In the presently preferred embodiment of the monitor 12, the predetermined time period is 20 seconds. This is sufficiently short to afford adequate time for attendants to apply resuscitation techniques and the like, should breathing or ventilation cease. On the other hand it is long enough so that the alarm signal is not generated for normal pauses or variations in the breathing rate of the patient. It will be appreciated, however, that the particular predetermined time period employed will be governed by the particular application of the monitor 12.

A feature of the invention is that it is adjustable to preset the minimum tidal volume below which the alarm means will be activated. To achieve this, the rod 40 is slidable within the guide tube 28, to adjust the position of the magnet 38 in the tube.

The magnetically responsive reed switch 37 is positioned in the base platform 36 so that the magnet 38 must be within a certain distance of the reed switch in order for it to be actuated. Thus, if the magnet 38 is positioned relatively close to the bellows 22, the bellows will have to expand a greater amount in order to move the magnet sufficiently close to the reed switch 37 to actuate it. On the other hand, if the magnet 38 is placed near the top of the guide tube 28, only a small expansion of the bellows 22 is needed to move the magnet close enough to the reed switch 37 to actuate it. Therefore, it can be seen that by adjusting the position of the magnet 38 within the guide tube 28, a greater or lesser expansion of the bellows 22 may be chosen to actuate the reed switch 37.

Since expansion of the bellows 22 corresponds to tidal volume, the rod 40 may be graduated proportionate to tidal volume, as at 41 in FIG. 7, so that a minimum tidal volume (to actuate the reed switch 37) can be easily and conveniently preset. It will be appreciated that, if the tidal volume expanding the bellows 22 is below the preset minimum, the magnet 38 will not be moved sufficiently close to the reed switch 37 to actuate it. If the tidal volume remains below the minimum for the predetermined 20-second time period, the alarm signal is generated.

It may be necessary to remove the respiration apparatus from the patient for a brief period, but one which is longer than the 20-second automatic alarm period, in order to perform certain medical procedures. If the monitor 12 is not turned off during these medical procedures, the alarm will be sounded. However, if the monitor is turned off, it is possible that a busy attendant could forget to turn it on again after the respiration apparatus is again in place on the patient.

To avoid this potential problem, an additional feature of the monitor 12 of the present invention is that its operation may be manually inhibited for a preset inhibit time period longer than the 20-second monitoring period. Under ordinary circumstances, it has been found that 60 seconds is a desirable inhibit period. At the end of the 60-second period, the spirometer monitor 12 automatically resumes the monitoring function.

When the rod 40 is being adjusted within the guide tube 28, it is desirable that the alarm signal be generated so that the reset position of the magnet 38 can be determined. To this end, the functioning of both the reset means and the inhibit means may be temporarily manually overridden to turn on the alarm. The alarm means is then reset when the reed switch 37 is actuated by the magnet 38.

Regarding the particular construction details of the spirometer monitor 12, the base platform 36 is generally circular and of molded plastic construction. A centrally located, molded hub 42 is provided through which the guide tube 28 slides. Suitable raised portions and bosses are provided on the surface of the base platform 36 for mounting a circuit board 44, a speaker 46, on-off inhibit and override switches 48, 50 and a battery 52. A cover 54 is provided which fits over the base platform 36 and is positioned in place by appropriate mating bosses and columns 56, 58 on the cover and base platform 36, respectively, and held together with screws 60.

Depending from the underside edge of the base platform 36 are a number of mounting tabs 62, the number and placement of which correspond to the vent holes 34 in the viewing dome 26. When the spirometer monitor is in place on the viewing dome 26, the tabs 62 project through the vent holes 34 with the monitor being held in place on the viewing dome by means of a spring-type retaining ring 64 which fits over the enlarged ends 66 of the tabs on the inside of the dome 26. The retaining ring 64 is slightly overlapped with suitable finger grips 68 on its ends so that the diameter of the ring may be increased by squeezing the finger grips together.

The hub 42 of the base platform 36 has a countersunk boss 70 which is adapted to fit over and clear the guide bushing 30 for the guide tube 28 on the top of the viewing dome 26 in the particular spirometer 14 for which the presently preferred embodiment of the spirometer monitor 12 is intended.

The magnetically responsive reed switch 37 employed in the spirometer monitor 12 of the present invention is carried within a depression in a reed switch mount 74 adjacent the hub 42. As shown in FIG. 3, the section of the hub 42 engaging the reed switch mount 74 is made planar, with the thickness of the hub wall at that point being reduced in thickness to bring the reed switch 37 as close as possible to the magnet 38 in the guide tube 28 which slides through the hub. The reed switch mount 74 is fixed in place against the planar section of the hub 42 and also against a post 76 spaced a short distance from the hub as shown in FIG. 3. The reed switch mount 74 is held in place against the post 76 and hub 42 by an appropriately shaped clamp 78 engaging both the hub and post and a screw fastener 80 coupling the reed switch mount to the clamp, as shown in FIG. 3.

The guide tube 28 (FIG. 7) utilized in the spirometer monitor of the present invention is constructed of a nonmagnetic material, such as a nonmagnetic metal, and of an adequate length so that the end of the tube is at least even with the top of the cover 54 of the spirometer monitor when the bellows 22 is fully collapsed.

The rod 40 which carries the magnet 38 and slides within the guide tube 28 is generally constructed of a moldable material such as plastic. In the illustrated preferred embodiment, the rod 40 has a T-shaped cross section with edges rounded to fit within the tube as shown in FIG. 10. The T-shaped cross section is particularly advantageous in that the graduations 41 indicating the minimum tidal volume may then be placed on a flat surface 82 of the rod 40 and the graduations will not be worn by the sliding of the rod within the guide tube 28.

The top end of the rod 40 is molded in the form of a handle 84 with a diameter larger than that of the inside of the guide tube 28 to facilitate raising or lowering of the rod and to prevent the rod from slipping completely into the guide tube.

The lower end portion 85 of the rod 40 (FIG. 8) has a generally tubular shape open at the bottom. The cylindrically-shaped magnet 38 is received in the tubular end portion 85 at its upper extremity. Below the location of the magnet 38, the rod portion 85 is formed with a plurality of longitudinal slots 86. The land areas 88 between the slots 86 are radially outwardly thickened to provide bearing surfaces 90 which frictionally contact the inside of the guide tube 28 and hold it in adjusted position.

To hold the magnet 38 in place within the tubular end of the rod 40, an insert 92 is provided which fits within the rod end in engagement to contact with the magnet. The insert 92 is also provided with an annular groove 94 in its surface opposite the slotted region of the tubular end of the rod 40. An O-ring 96 seated in the groove 94 tends to yieldably force the bearing surfaces 90 of the land areas 88 between the slots 86 radially outward against the inside surface of the guide tube 28 to provide sufficient frictional resistance to hold the rod 40 in place within the guide tube, but still allow the rod to slide within the tube relatively easily when desired.

The electronic apparatus of the presently preferred embodiment is illustrated in the schematic diagram of FIG. 11 and generally has an amplifier and loud speaker section 98 driven by an audio oscillator section 100 to produce an audible alarm signal. The audio oscillator of the oscillator section 100 is maintained in an inactive state by a reset circuit section 102 activated by the reed switch 37. An auxiliary inhibit circuit section 104 is also provided for controlling both the oscillator and the reset circuit and is activated by the on-off switch 48. An override circuit section 106 overrides the functioning of both the reset circuit section 102 and the inhibit circuit section 104.

While the particular alarm signal which is generated with the illustrated embodiment of the spirometer monitor is an audible sound signal, it should be appreciated that a number of advantageous alarm signals could also be generated in response to activation of the audio oscillator.

The amplifier and speaker utilized in an amplifier section 98 of the illustrated embodiment of the monitor 16 utilizes a Darlington Transistor $Q_1$ directly coupled to an 8-ohm speaker and is powered by the common battery power supply $E_{bb}$. When switch $SW_1$ is in the "on" position, the battery $E_{bb}$ is connected to the entire circuit.

The oscillator section 100 of the monitor utilizes a basic relaxation oscillator configuration in that a capacitor $C_1$ is charged from a power source through resistor $R_1$ until the threshold voltage of a threshold device across the capacitor $C_1$ is reached, at which time the capacitor $C_1$ rapidly discharges until the current through the threshold device is too low to maintain it in a conducting state. The threshold device then returns to a high impedance state and capacitor $C_1$ begins charging again.

In the particular relaxation oscillator utilized in the presently preferred embodiment shown, the threshold device is a silicon controlled switch $Q_2$ with an anode, a cathode and an anode gate. The characteristics of $Q_2$ are such that the anode to cathode impedance remains relatively high until the anode to cathode voltage reaches the anode gate to cathode voltage which determines the threshold voltage. When the threshold voltage is reached, the silicon controlled switch is triggered and the anode to cathode resistance drops to a relatively low value. The anode to cathode resistance returns to a relatively high value when the anode to cathode current drops below a certain level.

In the relaxation oscillator circuit shown, the anode gate voltage, and hence the threshold voltage, is determined by a voltage divider network consisting of $R_2$ and $R_3$ connected in series across $E_{bb}$. The anode of $Q_2$ is connected to the junction of $R_1$ and $C_1$ and the cathode of $Q_2$ is connected through the base circuit of $Q_1$ to the other side of capacitor $C_1$, also the common point for the entire circuit. The $R_1$–$C_1$ time constant is such that the relaxation oscillator oscillates at an audio frequency of about 500 cycles per second.

Resistor $R_4$ and parallel capacitor $C_2$ are connected between the base of $Q_1$ and the common point. $R_4$ dissipates leakage currents in the base circuit of $Q_1$ when in the quiescent state and $C_2$ smooths voltage changes to improve the sound of the audio oscillator.

In order to avoid a phenomenon of silicon controlled switches known as "latching" where a silicon controlled switch such as $Q_2$ remains on even after a very low anode to cathode current is reached, the power source for the $R_1-C_1$ timing network is derived from the junction of the collector of $Q_1$ and the speaker coil rather than from the battery $E_{bb}$ directly. It will be appreciated that when $Q_2$ fires, the amplifier transistor $Q_1$ greatly increases the current through the speaker, causing a voltage drop which momentarily decreases the supply voltage for the relaxation oscillator. This insures that $Q_2$ turns off and returns to its high resistance state.

As the relaxation oscillator produces the alarm signal, it is desired that the oscillator remain inactive until an alarm condition is detected. To this end, the reset circuit section 102 maintains the relaxation oscillator in an inoperative state until the reset signal, derived from a closing of the reed switch $SW_2$ (72), fails to occur for the predetermined time of 20 seconds.

To maintain the relaxation oscillator in an inactive state, capacitor $C_1$ is coupled through a diode $D_1$ to a second capacitor $C_3$. As the forward resistance of $D_1$ is quite low, $C_3$ is effectively connected in parallel across $C_1$ and the voltage appearing across both capacitors is essentially the same. It will be appreciated that both $C_1$ and $C_3$ must be charged through $R_1$, and $C_3$ is made sufficiently large so that the time required to build up the voltage across the parallel capacitors to the threshold voltage of $Q_2$ is approximately 20 seconds. If nothing further happens after 20 seconds, the threshold voltage of $Q_2$ would be reached and $C_1$ would discharge rapidly through $Q_2$. As current could not flow in the opposite direction through $D_1$, $C_3$ would be effectively isolated from the relaxation oscillator circuit which will then produce an audio frequency.

In order to insure that the relaxation oscillator remains inactive, the parallel capacitors $C_1$ and $C_3$ are discharged before the expiration of the 20-second time period. To accomplish this, the anode-cathode circuit of a second silicon controlled switch $Q_3$, substantially identical in operation to $Q_2$, is connected across $C_3$. Silicon controlled switch $Q_3$ is turned on by a pulse applied to the anode gate resulting from the closing of the reed switch $SW_2$ (72). Thus, it can be seen that if reed switch $SW_2$ (72) is closed before the predetermined time period of 20 seconds, the voltage across capacitor $C_3$ and $C_1$ is reset to its initial value and the relaxation oscillator is not activated.

Pulse triggering is applied to the anode gate $Q_3$ because it is possible that the spirometer bellows 22 and rod 40 may stop at a point where the magnet 38 would maintain the reed switch $SW_2$ (72) in a closed position. If the closing of the reed switch $SW_2$ (72) alone were to rigger $Q_3$, the bellows 22 of the spirometer could stop moving but, since $Q_3$ would remain on, capacitor $C_1$ and $C_3$ could not charge to the threshold point and the alarm signal would not be generated. To eliminate that possibility, the closing of $SW_2$ (72) generates a pulse which only momentarily closes $Q_3$ to discharge capacitor $C_1$ and $C_2$. $Q_3$ then returns to its high resistance state regardless of the position of the reed switch $SW_2$ (72).

To generate the required pulses for triggering $Q_3$, a normally uncharged capacitor $C_4$ is connected between the anode gate of $Q_3$ and the noncommon side of reed switch $SW_2$ (72). The anode gate of $Q_3$ is normally maintained at a positive potential above that of the anode by connecting the anode gate to the positive side of battery $E_{bb}$ through a resistor $R_5$. To ensure that capacitor $C_4$ is normally uncharged, the junction of capacitor $C_4$ and reed switch $SW_2$ is also connected to the positive side of battery $E_{bb}$ through a resistor $R_6$.

As capacitor $C_4$ is normally uncharged, when switch $SW_2$ is closed, anode gate of $Q_3$ is effectively connected to the common circuit point, lowering the anode gate potential below that of the anode, triggering $Q_3$. As long as reed switch $SW_2$ remains closed, capacitor $C_4$ will be charged through resistor $R_5$. When reed switch $SW_2$ is again opened, capacitor $C_4$ returns to its normal uncharged state by discharging through the circular path defined by resistors $R_5$ and $R_6$.

The auxiliary 60 second inhibit function is provided by an inhibit section 104 in which a third timing capacitor $C_5$ is connected across capacitors $C_1$ and $C_3$ through a diode $D_2$. When capacitor $C_5$ is initially uncharged, it is effectively connected in parallel across capacitor $C_1$ and $C_3$ through diode $D_2$. The charging time of resistor $R_1$ and parallel capacitors $C_1$, $C_3$ and $C_5$ is approximately 60 seconds. After that charging time, the threshold voltage across the parallel capacitors will be reached and the alarm signal sounded.

However, if at any time prior to the expiration of the 60-second period, reed switch $SW_2$ (72) should close, capacitors $C_3$ and $C_1$ will be discharged. But, since capacitor $C_5$ cannot discharge through diode $D_2$, capacitor $C_5$ will be effectively disconnected from the remainder of the circuit. Thus, in ordinary operation, $C_5$ would remain charged to a potential which kept it effectively disconnected from the reset and oscillator sections 102, 100 of the monitor.

To initiate the inhibit function, single-pole double-throw on-off switch $SW_1$ is moved to the "off" position. This disconnects the battery $E_{bb}$ from the main power supply line for the entire circuit. In the "off" position, the power line for the circuit is connected to the common point through a resistor $R_7$. Capacitor $C_5$ and, consequently, capacitors $C_3$ and $C_1$ are connected to the power line through a diode $D_3$ with its anode connected to the non-common side of capacitor $C_5$. As the voltage across capacitors $C_5$ and $C_3$ is above the voltage on the power line when it is connected to resistor $R_7$, diode $D_3$ is forward biased and capacitors $C_5$, $C_3$ and $C_1$ are discharged through the low-resistance path provided by diode $D_3$ and resistor $R_7$.

When on-off switch $SW_1$ is returned to the "on" position, resistor $R_7$ is disconnected from the power line and positive battery potential is applied to the power line. Diode $D_3$ is then reverse biased, effectively disconnecting capacitor $C_5$, $C_3$ and $C_1$ from the power line. Capacitors $C_5$, $C_3$ and $C_1$ are then charged in the manner described above to provide the initial inhibit time period.

The functioning of the reset section 102 and the inhibit section 104 can be overridden by manually operating the override section 106. In order for the oscillator section 100 to generate the alarm signal, capacitors $C_5$ and $C_3$ are relatively instantaneously charged to a potential above the threshold voltage for the relaxation oscillator. This is accomplished by connecting capacitors $C_5$ and $C_3$ to the midpoint of a voltage divider consisting of resistors $R_8$ and $R_9$. The top of the voltage divider $R_8-R_9$ is connected to the positive side of battery $E_{bb}$ through the push button override switch $SW_3$ (50).

When switch $SW_3$ is closed, the positive potential at the midpoint of the voltage divider $R_8-R_9$ is connected through a forward biased diode $D_4$ to the junction of capacitor $C_3$ and diode $D_2$. Resistors $R_8$ and $R_9$ are chosen so that the potential at their midpoint is above the threshold voltage of the relaxation oscillator. Capacitor $C_3$ is charged directly through $D_4$ and capacitor $C_5$ is charged through diode $D_2$ and diode $D_4$.

When switch $SW_3$ is opened, positive battery potential is removed from voltage divider $R_8-R_9$ and diode $D_4$ becomes back biased, effectively disconnecting the voltage divider from capacitors $C_5$ and $C_3$. The potential across capacitors $C_5$ and $C_3$ is then above the threshold voltage for the relaxation oscillator and the capacitors are then effectively disconnected from the oscillator section 100 as described above. The monitoring function of the monitor can be resumed by operating the inhibit section 104 or activation of the reset section 102.

While modifications may be made in the detailed circuitry of the monitor to fit individual needs, typical component types and values for the presently preferred embodiment described above are as follows:

| Component: | Value |
| --- | --- |
| $R_1, R_4, R_6$ | 1 megohm. |
| $R_2, R_3$ | 470 kilohms. |
| $R_5$ | 22 kilohms. |
| $R_7$ | 47 ohms. |
| $R_8$ | 1 kilohm. |
| $R_9$ | 2.2 kilohms. |
| $C_1, C_2, C_4$ | .0022 microfarads. |
| $C_3$ | 27 microfarads. |
| $C_5$ | 47 microfarads. |
| $D_1, D_2, D_3, D_4$ | Type 1N457A diode. |
| $Q_1$ | Type D16P2 Darlington Transistor (General Electric). |
| $Q_2, Q_3$ | Type D13T2 Silicon Controlled Switch (General Electric). |
| Speaker | 8-ohm miniature speaker. |
| $E_{bb}$ | 8.4 volt battery. |
| $SW_1$ | Single-pole, double-throw slide switch. |
| $SW_2$ | Reed switch. |
| $SW_3$ | Push button switch. |

From the foregoing, it will be appreciated that the spirometer monitor of the present invention utilizes a number of cascaded timing circuits, each progressively increasing the charging time before the threshold voltage of the threshold device is reached. Upon reaching that threshold voltage, however, the successive cascaded timing networks are effectively disconnected from the threshold device leaving a single timing circuit operating as a relaxation oscillator to produce an audible alarm signal. The threshold voltage is not reached, however, if a reset signal is received by one of the successive timing network which resets the timing capacitors back to an initial condition.

The reset signal is generated in response to particular movements of the bellows 22 in the spirometer, namely, movement of the bellows a sufficient distance to cause a magnet 38 to actuate a reed switch 72. If the bellows 22 does not move at all or if it moves an insufficient amount, the reed switch 72 is not actuated, the circuit is not reset, and the alarm is sounded.

While a particular embodiment of the spirometer monitor has been illustrated and described above, various modifications can be made without departing from the spirit and the scope of the invention. Accordingly, it is not intended that the invention be limited, except as by the appended claims.

We claim:

1. The combination of a spirometer monitor and a spirometer having an expansible-contractible chamber mounted in a case with a wall movable with respect to the case in response to expansion and contraction of the chamber, said monitor comprising:

a sensing means fixed in position with respect to the case of the spirometer;

follower means movable in accordance with movement of the wall and including an elongated member extending from said wall toward said sensing means and movable longitudinally relative thereto;

alarm means for generating an alarm signal, said alarm signal being generated following a predetermined time period after a reset condition of said alarm means; and reset means associated with said follower means and said sensing means for resetting said alarm means to said reset condition when said follower means is in a predetermined position with respect to said sensing means, said reset means including actuating means carried by said elongated member along a portion of its length and movable toward and away from said sensing means during movement of said wall, said sensing means being actuated to reset said alarm means to said reset condition when said actuating means is within a preselected distance from said sensing means.

2. The combination of claim 1, wherein said alarm means includes an electrical alarm-signal generating means, the activation of said the activation of said alarm-signal generating means being controlled by an electrical time delay network associated with said reset means.

3. The combination of claim 1, wherein said actuating means comprises a magnet and said sensing means is a reed switch.

4. The combination of claim 1, wherein said actuating means and said sensing means are selectively adjustable relative to each other longitudinally of said member to vary the position of the movable wall in which said alarm means is reset.

5. The combination of claim 4, wherein said actuating means is a magnet movably positioned along the length of said elongated member and said sensing means is a switch element movable by said magnet, and further including a calibrated rod telescoped with said member and connected to said magnet to move the latter and to indicate its position along the member.

6. The combination of a spirometer monitor and a spirometer having an expansible-contractible chamber mounted in a case with a wall movable with respect to the case in response to expansion and contraction of the chamber, said monitor comprising:

a sensing means fixed in position with respect to the case of the spirometer, said sensing means including a magnetically responsive means;

follower means movable in accordance with movement of the wall, said follower means carrying a magnet movable relative to said magnetically responsive means;

alarm means for generating an alarm signal following a predetermined time period after a reset condition of said alarm means; and reset means associated with said magnetically responsive means for resetting said alarm means to said reset condition when said magnet actuates said magnetically responsive means.

7. The combination of claim 6, wherein said follower means includes an elongated tube extending from the wall of the spirometer and said magnet is carried by a rod slidable within said tube.

8. The combination of claim 1, including an inhibit means for inhibiting the monitoring function of the spirometer monitor for a second predetermined time period which is longer than said first predetermined time period.

9. The combination of a spirometer monitor and a spirometer having an expansible-contractible chamber mounted in a case with a wall associated with the chamber being movable with respect to the case in response to expansion or contraction of the chamber, said monitor comprising:

a guide tube extending from the wall of the chamber;

a rod slidable within said guide tube, said rod having a magnet disposed along a portion of its length;

a base platform fixed in position with respect to the case of the spirometer, said platform having an opening through which said tube and carried rod extend;

magnetically responsive means mounted on said platform adjacent said opening; and electrical circuit means including an audible signal generating means, said audible signal generating means being activated following a predetermined time period after a reset condition of said electrical circuit means, said reset condition being generated when said magnetically responsive means responds to said magnet.

10. The combination of claim 9, including an electrical inhibit means for inhibiting the monitoring function of the spirometer monitor for a second predetermined time period in response to a manually initiated inhibit signal.

11. The combination of claim 1, including override means for activating said alarm means before the expiration of said first predetermined time period.

12. The combination of claim 6, including override means for activating said alarm means before the expiration of said first predetermined time period.

13. The combination of claim 6, including inhibit means for inhibiting the monitoring function of the spirometer monitor for a second predetermined time period which is longer than said first predetermined time period; and override means selectively operable to activate said alarm means.

14. The combination of a spirometer monitor and a spirometer having an expansible-contractible chamber mounted on a base and having a wall movable with respect to the base in response to expansion and contraction of the chamber, said monitor comprising:
   magnetically responsive sensing means stationarily mounted on the base of the spirometer;
   follower means supported for movement with said wall relative to said sensing means and including a magnetic actuator for actuating said sensing means when said actuator is within a preselected distance of the sensing means;
   resettable alarm means for generating an alarm signal following a preselected time delay after each resetting of said alarm means; and
   reset means associated with said sensing means for resetting said alarm means each time said actuator moves to within said preselected distance of said sensing means, thereby to prevent generation of said alarm signal.

15. The combination of a spirometer-monitor and a spirometer having an expansible-contractible chamber mounted on a base and having a wall movable with respect to the base in response to expansion and contraction of the chamber, said monitor comprising:
   sensing means mounted in a preselected position on the base of the spirometer;
   follower means supported for movement with said wall and including actuating means movable toward and away from said sensing means as said chamber expands and contracts;
   resettable alarm means for generating an alarm signal following a preselected time delay after each resetting of said alarm means;
   reset means associated with said sensing means for resetting said alarm means each time said actuator moves toward said sensing means to within a preselected distance thereof, thereby to prevent generation of said alarm signal; and
   means supporting said sensing means and said actuating means on said base and said follower means, respectively, for selective adjustment toward and away from each other thereby to change the position of said wall in which said alarm means is reset.